United States Patent
Schmidt et al.

(10) Patent No.: US 7,128,776 B2
(45) Date of Patent: Oct. 31, 2006

(54) PERIODIC HIGH TEMPERATURE REGENERATION OF THERMAL SWING ADSORPTION SYSTEMS

(75) Inventors: William Paul Schmidt, Wescosville, PA (US); Steven Ray Auvil, Macungie, PA (US); Mohammad Ali Kalbassi, Weybridge (GB); Timothy Christopher Golden, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 287 days.

(21) Appl. No.: 10/797,742

(22) Filed: Mar. 10, 2004

(65) Prior Publication Data

US 2005/0199123 A1    Sep. 15, 2005

(51) Int. Cl.
*B01D 53/04* (2006.01)
*B01D 53/26* (2006.01)

(52) U.S. Cl. .............. 95/115; 95/126; 95/129; 95/139

(58) Field of Classification Search .......... 95/96, 95/99, 106, 114, 115, 117, 126, 120, 123, 95/129, 139, 148; 96/132
See application file for complete search history.

(56) References Cited

U.S. PATENT DOCUMENTS

| | | | | |
|---|---|---|---|---|
| 3,893,827 | A | * | 7/1975 | Leppard ........................ 95/96 |
| 4,481,018 | A | | 11/1984 | Coe et al. |
| 5,531,808 | A | | 7/1996 | Ojo et al. |
| 5,614,000 | A | * | 3/1997 | Kalbassi et al. ............... 95/96 |
| 5,689,974 | A | | 11/1997 | Fujita et al. |
| 5,766,311 | A | * | 6/1998 | Ackley et al. ............... 95/115 |
| 5,906,675 | A | | 5/1999 | Jain et al. |
| 5,919,286 | A | * | 7/1999 | Golden et al. ................. 95/98 |
| 5,931,022 | A | | 8/1999 | Deng et al. |
| 6,106,593 | A | | 8/2000 | Golden et al. |
| 6,273,939 | B1 | | 8/2001 | Millet et al. |
| 6,373,939 | B1 | | 4/2002 | Reese et al. |

FOREIGN PATENT DOCUMENTS

EP    1 226 860 A1    7/2002

* cited by examiner

*Primary Examiner*—Frank M. Lawrence
(74) *Attorney, Agent, or Firm*—Robert J. Wolff

(57) ABSTRACT

An improved thermal swing adsorption process is set forth which addresses the problem of water ingress into the adsorbent by periodically heating the adsorbent to a temperature greater than the temperature used in the normal regeneration cycle.

13 Claims, No Drawings

PERIODIC HIGH TEMPERATURE REGENERATION OF THERMAL SWING ADSORPTION SYSTEMS

BACKGROUND OF THE INVENTION

Thermal swing adsorption (TSA) systems for the removal of contaminant from a gas stream are taught in the art. TSA systems generally comprise a repeating cycle of steps including:
(i) contacting the gas stream with an adsorbent selective for the retention of a contaminant in order to adsorb at least a portion of the contaminant from the gas stream wherein this step (i) is conducted at an initial temperature;
(ii) heating the adsorbent to a regeneration temperature in order to desorb at least a portion of the contaminant adsorbed in step (i); and
(iii) cooling the adsorbent to the initial temperature before starting a new cycle.

The regeneration temperature generally ranges anywhere from 40° C. to 400° C., but once selected, generally remains generally constant from cycle to cycle. See for example U.S. Pat. Nos. 5,531,808, 5,689,974, 5,906,675, 6,106,593, 6,273,939, and EP 1226860.

The adsorbent bed in TSA systems typically includes a layer of desiccant (such as silica gel or alumina) to remove water since, even at ppm levels, water adversely impacts the capacity of the adsorbent to adsorb contaminants. Notwithstanding the use of desiccants, water ingress into the adsorbent remains a problem in TSA systems. This is especially true just prior to start-up when the adsorbent is initially loaded in wet ambient air, or during a plant upset in which water breaks through the desiccant layer and into the adsorbent layer. In the past, this type of situation has required that the adsorbent be discarded and fresh adsorbent loaded.

The present invention addresses the problem of water ingress by periodically heating the adsorbent to a second regeneration temperature greater than the first regeneration temperature. The present invention is particularly useful where the TSA adsorbent utilized is particularly sensitive to water, such as where the adsorbent comprises a zeolite molecular sieve.

Pressure swing adsorption (PSA) systems are also taught in the art for the removal of contaminant from a gas stream. PSA systems generally comprise a repeating cycle of steps including:
(i) passing the gas stream through a vessel containing an adsorbent selective for the retention of a contaminant in order to adsorb at least a portion of the contaminant from the gas stream wherein this step (i) is conducted at an initial elevated pressure;
(ii) depressurizing the adsorbent-containing vessel in order to desorb at least a portion of the contaminant adsorbed in step (i); and
(iii) repressurizing the adsorbent-containing vessel to the initial elevated pressure before starting a new cycle.

It can be seen that whereas regeneration of adsorbent in TSA systems is accomplished by a temperature swing, regeneration of adsorbent in PSA systems is accomplished by a pressure swing. Consequently, PSA systems include no cyclical heating of the adsorbent.

U.S. Pat. No. 5,931,022 teaches a PSA system which includes non-cyclical heating of the adsorbent. In particular, U.S. Pat. No. 5,931,022 teaches periodic heating of the adsorbent to temperatures between 50 and 300° C. to address water ingress into the adsorbent. In the case of U.S. Pat. No. 5,931,022, an adsorbent comprising alumina is utilized to remove $CO_2$. The skilled practitioner will appreciate that alumina is easy to dehydrate, at least compared to the zeolite molecular sieve type adsorbent for which the present invention is particularly suited.

U.S. Pat. No. 4,481,018 teaches a PSA system which utilizes an X type zeolite for $N_2$ removal. This patent recognizes the importance of regeneration gas flow rate to ensure good $N_2$ capacity of zeolites, typically Ca exchanged X zeolites. Table V in this patent shows the importance of regeneration gas flow rate or contact time on the $N_2$ capacity of CaX. At a regeneration gas contact time of 9 seconds (0.15 minutes), the $N_2$ Henry's law constant on CaX was 2.4 mmole/g/atm. When the regeneration gas contact time was increased to 27 seconds (0.45 min), the $N_2$ Henry's law constant was decreased 33% to 1.6 mmole/g/atm. U.S. Pat. No. 4,481,018 does not teach the effect of regeneration gas contact time on $CO_2$ capacity as per Example 4 herein.

BRIEF SUMMARY OF THE INVENTION

The present invention is an improved thermal swing adsorption process for the removal of contaminant from a gas stream. A key to the present invention is it addresses the problem of water ingress into the adsorbent by periodically heating the adsorbent to a temperature greater than the temperature used in the normal regeneration cycle.

DETAILED DESCRIPTION OF THE INVENTION

The present invention relates to a thermal swing adsorption (TSA) process for the removal of contaminant from a gas stream, said process comprising a repeating cycle of steps including:
(i) contacting the gas stream with an adsorbent selective for the retention of a contaminant in order to adsorb at least a portion of the contaminant from the gas stream wherein this step (i) is conducted at an initial temperature;
(ii) heating the adsorbent to a first regeneration temperature in order to desorb at least a portion of the contaminant adsorbed in step (i); and
(iii) cooling the adsorbent to the initial temperature before starting a new cycle.

The present invention is an improvement to the above process for addressing the problem of water ingress into the adsorbent. The improvement comprises a periodic heating step wherein the adsorbent is periodically heating to a second regeneration temperature greater than the first regeneration temperature.

In one embodiment of the present invention, the first regeneration temperature ranges from 40 to 200° C. while the second regeneration temperature ranges from 200 to 400° C. In another embodiment, the second regeneration temperature is at least 50° C. higher than the first regeneration temperature.

The frequency of the present invention's periodic heating step is intended to match the frequency of water ingress incidents, such as when the adsorbent is initially loaded in wet ambient air just prior to start-up, or when there is a plant upset. Accordingly, another embodiment of the present invention is where the periodic heating step is conducted just prior to start-up and/or just after a plant upset. In another embodiment, the frequency of the present invention's periodic heating step is triggered by a threshold level of $CO_2$ breakthrough (for example where the time average $CO_2$ breakthrough is in excess of 50 to 100 ppb).

The capacity of zeolites to adsorb $CO_2$ or $N_2O$ is particularly sensitive to water ingress into the adsorbent. Accordingly, another embodiment of the present invention is where the adsorbent comprises a zeolite (such as NaX, NaLSX, CaX, CaLSX, 5A and binderless versions thereof) and the contaminant comprises $CO_2$ and/or $N_2O$.

In another embodiment of the present invention, the adsorbent is a layered system where a layer of desiccant (such as alumina, base treated alumina, silica gel, water stable gel, alumina/zeolite composites and mixtures thereof) is followed by a layer of adsorbent. In another embodiment, multiple layers of adsorbent can be utilized where each layer is selective for the removal of a different contaminant. For example, where removal of both $CO_2$ and $N_2O$ are required, the adsorbent could comprise a first layer of a $CO_2$ selective adsorbent (such as NaX zeolite) and a second layer of a $N_2O$ selective adsorbent (such as CaX zeolite). In another embodiment, the resultant dry and contaminant free gas is an air stream that is distilled into its constituent components (i.e. $O_2$, $N_2$, Ar, etc.) in a cryogenic separation unit.

The temperature of the feed gas stream in the present invention is suitably −80 to 100° C. (preferably 0–60° C., and more preferably 10–50° C.) while the pressure is suitably at least 100,000 N/m2 (preferably 200,000 to 3,000,000 and more preferably 200,000 to 1,500,000 N/m2). The regeneration pressure is suitably 10,000 to 3,000,000 N.m2 (preferably 50,000 to 1,000,000 N/M2 but in any event preferably not greater than 50% of the feed pressure). Prior to the periodic heating step of the present invention, the molar ratio of regeneration gas to feed gas is suitably 0.05 to 0.8, preferably 0.2 to 0.5.

The following examples demonstrate the usefulness of other embodiments of the present invention.

EXAMPLE 1

NaX zeolite is widely used to remove trace $CO_2$ from air prior to the cryogenic distillation of the air into its constituent components. The typical as-received water loading for a commercial grade NaX zeolite is 1.5 wt %. Table 1 below gives the residual water content (determined by weight loss at 600° C.) for a commercial grade NaX zeolite as a function of regeneration temperature. The table also gives the relative equilibrium $CO_2$ capacity determined by breakthrough from air (100 psig, 25° C., 400 ppm $CO_2$ in air).

TABLE 1

| Regeneration T (° C.) | Residual water (wt %) | Relative $CO_2$ capacity |
|---|---|---|
| 400 | 0.4 | 1.0 |
| 300 | 1.2 | 0.78 |
| 200 | 1.6 | 0.62 |

Typically, it is desired to operate TSA systems at a regeneration temperature as low as possible. This is to reduce the power requirements of the system. A typical TSA regeneration temperature is 200° C. As shown in Table 1, regeneration of the NaX zeolite at 200° C. reduces the residual water content of the zeolite to 1.6 wt %, which is essentially the as-received water loading from the vendor. If however, the initially loaded NaX could be regenerated at 300° C., the residual water loading would be reduced to 1.2 wt % and the $CO_2$ capacity of the system could be improved by 26% (0.78/0.62). Even more striking is that if a regeneration temperature of 400° C. can be achieved, the water loading drops to 0.4 wt % and the $CO_2$ capacity increases over 200° C. regenerated material by 61% (1.0/0.62). Since the TSA design of choice is a 2-layer system (desiccant followed by adsorbent), the initial high temperature regeneration should not be needed again unless a plant upset occurs. The advantage of the present invention is that the adsorbent functions like a material that has been regenerated at high temperature (in excess of 200° C.), but needs to be regenerated only once at that temperature since the desiccant pre-layer does not allow water ingress into the adsorbent.

EXAMPLE 2

Example 1 was repeated for a commercially available CaX zeolite (often used for the removal of $N_2O$ from ambient air). Since CaX adsorbs water more strongly than NaX, its performance is even more drastically affected by high regeneration temperature.

TABLE 2

| Regeneration T (° C.) | Residual water (wt %) | Relative $CO_2$ capacity |
|---|---|---|
| 400 | 0.7 | 1.0 |
| 300 | 1.4 | 0.71 |
| 200 | 2.5 | 0.51 |

At a regeneration temperature of 200° C., CaX has significantly more water loading than as-received material. Therefore, if a plant upset occurs on a plant with a 200° C. regeneration system, the system will not recover its initial $CO_2$ capacity. If regeneration at 300° C. is carried out, the $CO_2$ capacity increases 39% (0.71/0.51). At 400° C. regeneration, the $CO_2$ capacity increases 96% (1.0/0.51). Again, these large capacity increases can be realized with only one high temperature regeneration.

The skilled practitioner will appreciate that zeolite adsorbents are susceptible to hydrothermal steaming and loss of capacity during thermal dehydration. Example 3 and Example 4 illustrate that lower regeneration flows or contact times are required to reclaim zeolite capacity for $CO_2$ than for $N_2$. This has not been appreciated in the prior art. Lower regeneration flows result in lower regeneration costs and less regeneration time.

EXAMPLE 3

In this example, a commercial grade CaX zeolite was regenerated at 400° C. under various flow rates of nitrogen. After regeneration was complete (16 hours), the samples were cooled down and nitrogen adsorption isotherms were measured at 30° C. The results obtained are given in Table 3.

TABLE 3

| (ft/sec) Linear regen flow rate | (sec) Regeneration contact time | Relative $N_2$ capacity |
|---|---|---|
| 0.90 | 0.74 | 1.0 |
| 0.37 | 1.8 | 1.0 |
| 0.18 | 3.7 | 0.89 |
| 0.089 | 7.5 | 0.81 |
| 0.039 | 17.3 | 0.57 |

The relative $N_2$ capacity is defined as the ratio of the Henry's law constant (initial isotherm slope) at the given flow rate divided by the Henry's law constant obtained at the highest linear regeneration velocity. The results in Table 3 show that at high linear regeneration flow rates (short contact times), high $N_2$ capacities are obtained. However, as the regeneration linear velocity goes below 0.37 ft/sec (regeneration contact time of 1.8), the $N_2$ capacity is reduced. This shows that if optimal $N_2$ capacities of CaX are desired, regeneration flow rates should not dip below about 0.37 ft/sec.

EXAMPLE 4

The same experiment as described in Example 3 above was carried out except this time $CO_2$ capacity and not $N_2$ capacity was measured. The $CO_2$ capacity was measured by $CO_2$ breakthrough from air at 400 ppm, 25° C. and 100 psig. The results are shown in Table 4.

TABLE 4

| (ft/sec) Linear regen flow rate | (sec) Regeneration contact time | Relative $CO_2$ capacity |
| --- | --- | --- |
| 0.90 | 0.74 | 1.0 |
| 0.37 | 1.8 | 1.0 |
| 0.18 | 3.7 | 1.0 |
| 0.089 | 7.5 | 0.97 |
| 0.039 | 17.3 | 0.88 |

The data in Examples 3 and 4 suggests that as long as the regeneration gas linear velocity is at least 0.10 ft/sec, there will be little effect on $CO_2$ adsorption capacity.

Examples 5 and 6 are shown to compare the present invention with U.S. Pat. No. 5,931,022 which teaches periodic heating of the alumina adsorbent to address water ingress in a PSA system utilizing alumina for $CO_2$ removal.

EXAMPLE 5

Table 5 below gives the relative $CO_2$ capacity measured on a commercial grade activated alumina following initial regeneration at 30 and 300° C. The $CO_2$ capacities were measured on a standard volumetric adsorption unit. The material was then reactivated at 30° C. (standard regeneration temperature for a PSA) and the $CO_2$ capacity remeasured. This process was repeated 3 times and Table 5 shows the $CO_2$ capacity of the alumina after initial 300° C. regeneration followed by 3 regenerations at 30° C. after exposure to $CO_2$.

TABLE 5

| Initial Regeneration Temperature (° C.) | Initial Relative $CO_2$ Capacity | Relative $CO_2$ Capacity after 3 Adsorption/regen Cycles at 30° C. | Ratio of capacity after 3 regen cycles/initial capacity |
| --- | --- | --- | --- |
| 30 | 1.0 | 0.85 | 0.85 |
| 300 | 58.3 | 0.83 | 0.014 |

The results in Table 5 show that regeneration of activated alumina at 300° C. leads to a very high initial increase in $CO_2$ capacity. However, once the regeneration temperature is returned to the standard regeneration temperature, the $CO_2$ capacity quickly reverts back to the capacity at the low regeneration temperature. The skilled practitioner will appreciate this is because the increase in $CO_2$ capacity of alumina following high regeneration temperature is due to $CO_2$ chemisorption on specific oxide sites produced on the alumina by high temperature activation. To recover this high $CO_2$ capacity, the regeneration temperature must remain high to generate the oxide chemisorption sites. Thus, the high $CO_2$ capacity achieved by high regeneration temperature is not retained at subsequent lower or "standard" regeneration conditions.

EXAMPLE 6

The same experiment as described in Example 5 above was carried out except this time the adsorbent tested was a commercial grade NaX zeolite and the "standard" regeneration temperature was 150° C., indicative of a TSA process.

TABLE 6

| Initial Regeneration Temperature (° C.) | Relative $CO_2$ capacity | Relative $CO_2$ capacity after 3 adsorption/regen cycles at 150° C. | Ratio of capacity after 3 regen cycles/initial capacity |
| --- | --- | --- | --- |
| 200 | 1.0 | 0.98 | 0.98 |
| 300 | 1.26 | 1.26 | 1.0 |

The results in Table 6 show that the when NaX zeolite is initially regenerated at 200 or 300° C. and then subsequently regenerated at a lower "standard" TSA regeneration temperature of 150° C., the $CO_2$ capacity remains the same as following high temperature regeneration. The last column in Table 6 shows that the $CO_2$ capacity is unchanged after initial high temperature regeneration followed by a lower regeneration temperature. This is because the $CO_2$ adsorbed on zeolites is physically adsorbed and can readily be desorbed by heating to temperatures in excess of 100° C. In example 5, the alumina adsorbent did not retain its high $CO_2$ capacity after an initial high regeneration temperature followed by a series of lower, standard regeneration temperatures. The sample regenerated at 300° C. only retained 1.5% of the initial capacity after three regeneration cycles at 30° C.

The above examples cover removal of $CO_2$ and $N_2O$ from an air feed stream, but it should be recognized the present invention is applicable to the removal of any component from any feed stream. For example, the present invention is applicable to the removal of trace hydrocarbons from air, prior to separating the air by cryogenic distillation. Trace hydrocarbons include, but are not limited to methane, ethane, ethylene, acetylene, propane, propylene, and higher boiling point hydrocarbons, such $C_4+$ hydrocarbons (including saturated, unsaturated, and aromatic hydrocarbons.) The trace contaminants can be removed by the same adsorbent(s) that remove $CO_2$ and/or $N_2O$, or a different adsorbent, optimized for the removal of the remaining trace contaminants. As another example, the present invention is applicable to a TSA system that removes water and $CO_2$ from a synthesis gas stream comprising hydrogen and carbon monoxide.

The invention claimed is:

1. In a thermal swing adsorption process for the removal of contaminant from a gas stream, said process comprising a repeating cycle of steps including:
    (i) contacting the gas stream with an adsorbent selective for the retention of a contaminant in order to adsorb at least a portion of the contaminant from the gas stream wherein this step (i) is conducted at an initial temperature;

(ii) heating the adsorbent to a first regeneration temperature in order to desorb at least a portion of the contaminant adsorbed in step (i); and (iii) cooling the adsorbent to the initial temperature before starting a new cycle;

the improvement comprising a periodic heating step wherein the adsorbent is periodically heating to a second regeneration temperature greater than the first regeneration temperature.

2. The process of claim 1 wherein the first regeneration temperature ranges from 40 to 200° C. and the second regeneration temperature ranges from 200 to 400° C.

3. The process of claim 1 wherein the second regeneration temperature is at least 50° C. higher than the first regeneration temperature.

4. The process of claim 1 wherein the periodic heating step is conducted just prior to start-up.

5. The process of claim 1 wherein the periodic heating step is conducted just after a plant upset.

6. The process of claim 1 wherein the frequency of the periodic heating step is triggered by a threshold level of $CO_2$ breakthrough.

7. The process of claim 1 wherein the adsorbent comprises a zeolite and the contaminant comprises $CO_2$.

8. The process of claim 7 wherein step (ii) involves contacting the adsorbent with a flow of regeneration gas having a linear velocity of at least 0.1 ft/sec.

9. The process of claim 8 wherein the regeneration gas is a dry $N_2$ rich gas.

10. The process of claim 7 wherein the contaminant further comprises $N_2O$.

11. The process of claim 10 where the adsorbent comprises a first layer of NaX zeolite for the removal of the $CO_2$ contaminant and a second layer of CaX zeolite for the removal of the $N_2O$ contaminant.

12. The process of claim 1 wherein the adsorbent is layered over a layer of desiccant.

13. The process of claim 1 wherein the process produces a dry and contaminant free gas air stream that is subsequently distilled into its constituent components in a cryogenic air separation unit.

* * * * *